US010755227B1

United States Patent
Aggarwal et al.

(10) Patent No.: US 10,755,227 B1
(45) Date of Patent: Aug. 25, 2020

(54) RAPID WORKSPACE REPRESENTATION DEPLOYMENT FOR INVENTORY SYSTEMS

(71) Applicant: Amazon Technologies, Inc., Seattle, WA (US)

(72) Inventors: Aayush Aggarwal, Medford, MA (US); Vishnu Ayyagari, Boxboro, MA (US); Matthew Paul Bell, Newton, MA (US); Sarfraz Banglawala, Wakefield, MA (US); James Plumley, Pelham, NH (US)

(73) Assignee: Amazon Technologies, Inc., Seattle, WA (US)

( * ) Notice: Subject to any disclaimer, the term of this patent is extended or adjusted under 35 U.S.C. 154(b) by 171 days.

(21) Appl. No.: 15/691,316

(22) Filed: Aug. 30, 2017

(51) Int. Cl.
*G06Q 10/08* (2012.01)
*G05D 1/02* (2020.01)

(52) U.S. Cl.
CPC ......... *G06Q 10/087* (2013.01); *G05D 1/0274* (2013.01); *G05D 2201/0216* (2013.01)

(58) Field of Classification Search
USPC .......................................................... 705/28
See application file for complete search history.

(56) References Cited

U.S. PATENT DOCUMENTS

| | | | | |
|---|---|---|---|---|
| 8,280,547 B2* | 10/2012 | D'Andrea | ............... | B66F 9/063 700/214 |
| 9,087,314 B2* | 7/2015 | Hoffman | ............... | G06Q 10/087 |
| 9,452,883 B1 | 9/2016 | Wurman et al. | | |
| 9,818,002 B1 | 11/2017 | Yunes et al. | | |
| 9,953,287 B1 | 4/2018 | Mcdonald, Jr. et al. | | |
| 10,217,074 B1 | 2/2019 | Stallman et al. | | |
| 10,409,281 B1 | 9/2019 | Garrett et al. | | |
| 2014/0129393 A1 | 5/2014 | Soon-Shiong et al. | | |
| 2017/0193406 A1 | 7/2017 | Berman | | |

OTHER PUBLICATIONS

U.S. Appl. No. 15/796,491, U.S. Patent Application, filed Oct. 27, 2017, Titled: Nondisruptive Workspace Representation Deployment for Inventory Systems.

* cited by examiner

*Primary Examiner* — Garcia Ade
(74) *Attorney, Agent, or Firm* — Kilpatrick Townsend & Stockton LLP

(57) ABSTRACT

Systems and methods described herein pertain to maintaining a virtual representation of a workspace in a material handling system and updating the virtual representation. Methods described include maintaining the virtual representation of a material handling grid, maintaining one or more clients operable to direct movement of the plurality of drive units in the workspace; receiving an instruction to update the virtual representation of the drive-unit navigable grid including an updated virtual representation of the workspace; and querying a subset of the one or more clients to determine whether the update to the virtual representation would cause one conflicts within the workspace. Potential conflicts include, but are not limited to, "stranded" resources which are no longer positioned on the material handling grid, and/or workstations that have not yet been suspended prior to the update. Methods further include, upon determining that the updated virtual representation would not cause a conflict, deploying the updated virtual representation to replace an existing virtual representation of the workspace.

9 Claims, 12 Drawing Sheets

RAPID WORKSPACE REPRESENTATION DEPLOYMENT FOR INVENTORY SYSTEMS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, sorting, retrieving, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput. In particular, as inventory systems expand in capacity and complexity, the challenges of adapting an inventory system to modifications also increase.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Inventory systems can enhance throughput by efficiently using space and by employing automation, including robotic means to lift, transport, and place inventory. In order to enable the seamless processing of inventory by said robotics, modern inventory systems track the positions and status of multiple robotic systems in order to control how they interact with one another and how they occupy and move through space. One way to enable such processing is by maintaining a virtual representation of an inventory system that corresponds to the physical inventory system, and which governs how the inventory system controls the robotic elements within the physical inventory system. Such inventory systems can include a workspace, which may be presented as a material handling grid, with a concomitant virtual workspace and virtual material handling grid.

One significant drawback in such automation has been that, as the physical systems and their representative virtual systems grow more complex, the task of introducing changes to the physical system has also grown more complex. For example, a physical change to the position of any subsystem or obstacle within a physical inventory system must correspond to an update in the virtual inventory system. Furthermore, aspects of the inventory system's behavior may also be controlled by the virtual inventory system, without visible changes to the physical inventory system. In some cases, many disparate software modules have to interact with one another to manage an inventory system; creating the possibility of conflicts or errors that could be generated inadvertently when a change is implemented. These drawbacks compete functionally with advantages of increased automation, workspace complexity, and compactness.

Figure 1:
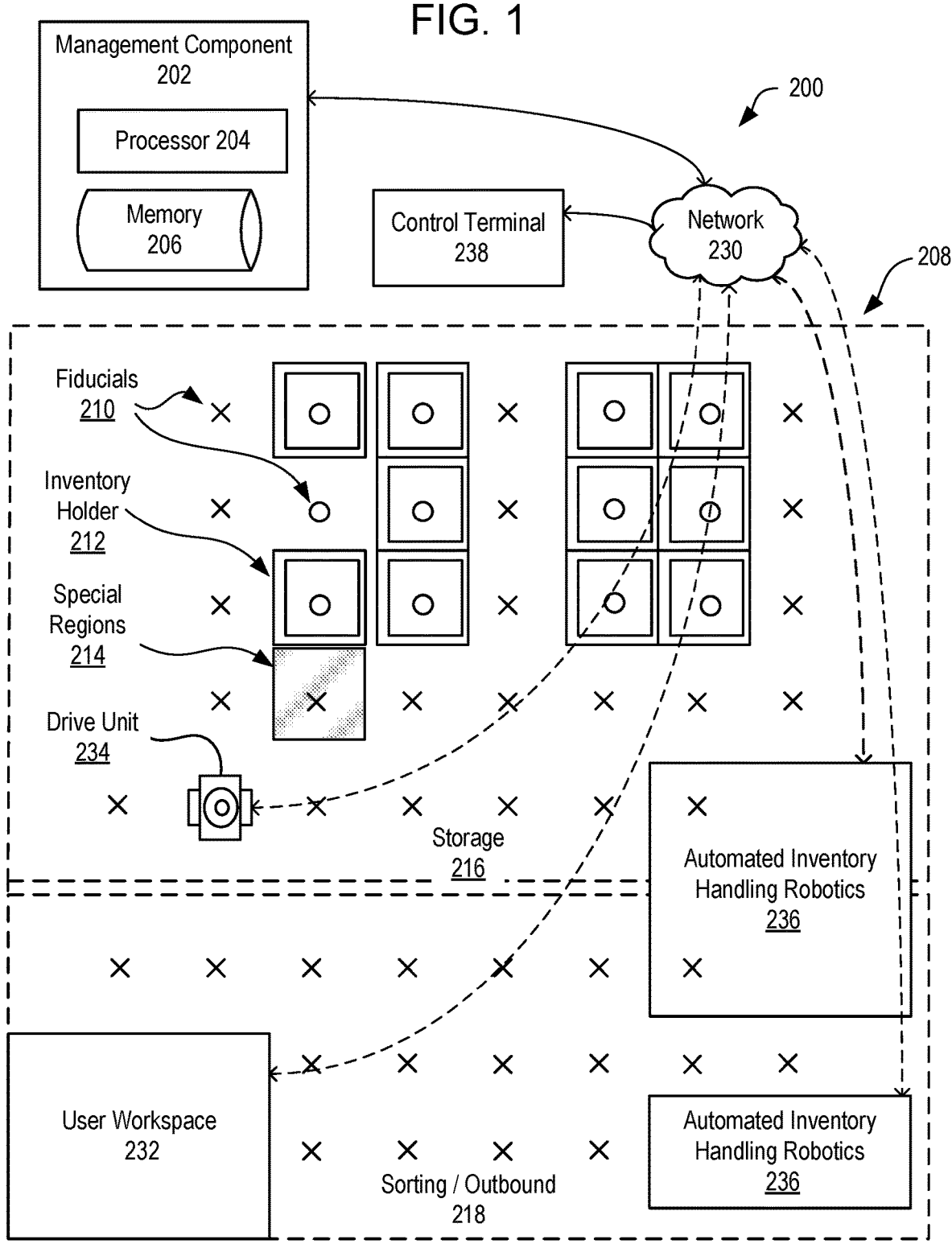
FIG. 1 is a simplified schematic diagram illustrating an example inventory system, in accordance with some embodiments.

Embodiments herein are directed to an inventory system potentially having multiple inventory holders, drive units for moving the inventory holders, and robotic systems for handling inventory in conjunction with a virtual inventory system that monitors and controls the positions and activities of components of the inventory system. In accordance with an embodiment, FIG. 1 illustrates one such example system 100. Specific embodiments relate to methods and systems for performing a rapid deployment of updated map information for use by an inventory system and/or material handling system.

FIG. 1 illustrates an example inventory system 200 that utilizes a material handling grid 208 in an inventory facility, in accordance with some embodiments. Aspects of the system 200 are directed by a controller or management component 202, which includes a processor and memory 204, 206. Specific attributes of the management component 202, associated modules, and processes are discussed below with greater detail with reference to FIGS. 7-10. The management component 202 can communicate with other system components via a network 230, such as a wireless network. The system 200 can be used to manage inventory items in the context of the workspace, which can include multiple working regions, such as but not limited to a storage region 216 and/or a sorting region 218. The material handling grid 208 may be defined by the physical space in which the inventory and inventory holders 212 rest, and on which unmanned drive units 234 operate in order to move and store inventory within the inventory facility. A virtual representation of the workspace can be maintained by the management component 202 in order to facilitate control over various resources of the workspace, including the drive units 234 moving therein. The virtual representation stores location information concerning the static components of the inventory system 200, which can include physical obstructions, locations of fiducial markings, locations of chargers for drive units, inventory handling stations, physical equipment or articles hanging from a ceiling or frame that may allow drive to tunnel while preventing transit by drive units laden with inventory, and other representations of physical aspects of the inventory system. The virtual representation can also store virtual information, including designations of regions as preferred for transit of units and preferred for storage, designations of weights of particular grid positions for travel, e.g., for use as highways or aisles in a storage region, positions of station queues, and positions and orientations of one way "streets" for transit by drive units, among other aspects. Typically, the dynamic components such as momentary positions of drive units may be stored by a drive unit controller and/or space allocator service. Control over the inventory system 200, including control to update the virtual representations therefor, can be conducted by a user at one or more control terminals 238, which can communicate with the management component 202 via the network 230, and which may be on-site, remote, or connected with one or more user workspaces 232.

In some embodiments, the material handling grid 208 can include a laid-out set of grid positions, which may include machine-readable fiducial markings 210. Generally, each grid position will be uniform and sized to accommodate inventory system resources, such as but not limited to drive units 234 and inventory holders 212 as shown. Other resources can include automated inventory handling robotics 236, such as automated sorting equipment, lifts, carriers such as shuttles and the like; or a user workspace 232, which may be delimited by grid positions and include facilities for assisting user tasks. The physical grid positions correspond to grid positions in the virtual representation of the workspace, so that the management component 202 can track positions and actions of resources as they move about the material handling grid 208. The fiducial markings 210 can include machine-readable indicia for use by drive units 234, or other system resources, to identify their current position in the inventory system. In some embodiments, resources in the material handling grid 208 can use the fiducial markings 210 as guides for transiting within the workspace, as will be described in greater detail with reference to FIG. 2 below.

In general, the fiducial markings 210 define positions in the material handling grid 208, while the virtual representation of the workspace can designate certain of those positions for tasks. The positions in the material handling grid 208 are defined not only by location, but also by a set of rules for each location. For example, subsets of positions in the material handling grid 208 may be designated for transportation of inventory holders 212 by drive units 234, as denoted by 'X' markings, while other subsets of the positions may be designated for storage of inventory holders, as denoted by 'O' markings. The arrangement of these designations in the virtual representation of the workspace will tend to create systems of pathways within the inventory system, e.g., regions designated for transportation of inventory holders can be aligned to provide direct paths for the removal or return of inventory holders between storage regions and periphery stations around the material handling grid 208, while regions designated for storage of inventory holders can provide paths for the outbound transit of empty drive units 234 to retrieve inventory holders, and the like.

The system 200 can also generate designations for specific regions, e.g., regions for accommodating automated inventory handling robotics 236. Automated inventory handling robotics stations 236 may designate specific locations for receiving drive units 234, either within or adjacent to the station; and may restrict access by drive units to certain locations, e.g., some locations may be removed as drive-unit accessible locations due to overlap with some physical structure of the station; or some locations may be height-restricted, thus allowing clearance therethrough by empty drive units or drive units carrying only certain forms of inventory holders and not others. Also by way of example, user workspaces 232 may be defined with respect to the material handling grid 208, e.g. as regions that are either removed from the material handling grid 208 to prevent access by drive units 234, or designated as inaccessible by drive units. Special regions 214 may be designated throughout the material handling grid 208 for the application of specific rules. For example, in some embodiments, the flow of drive units 234 through certain spaces may be managed to create specific traffic patterns that better manage the volume of movement. By way of example, sets of positions may be designated for one-way travel by drive units 234, particularly near resources to which many drive units are tasked with moving inventory; or individual positions may be subjected to access limits or traffic limits to address traffic issues that may arise during operation.

Figure 2:
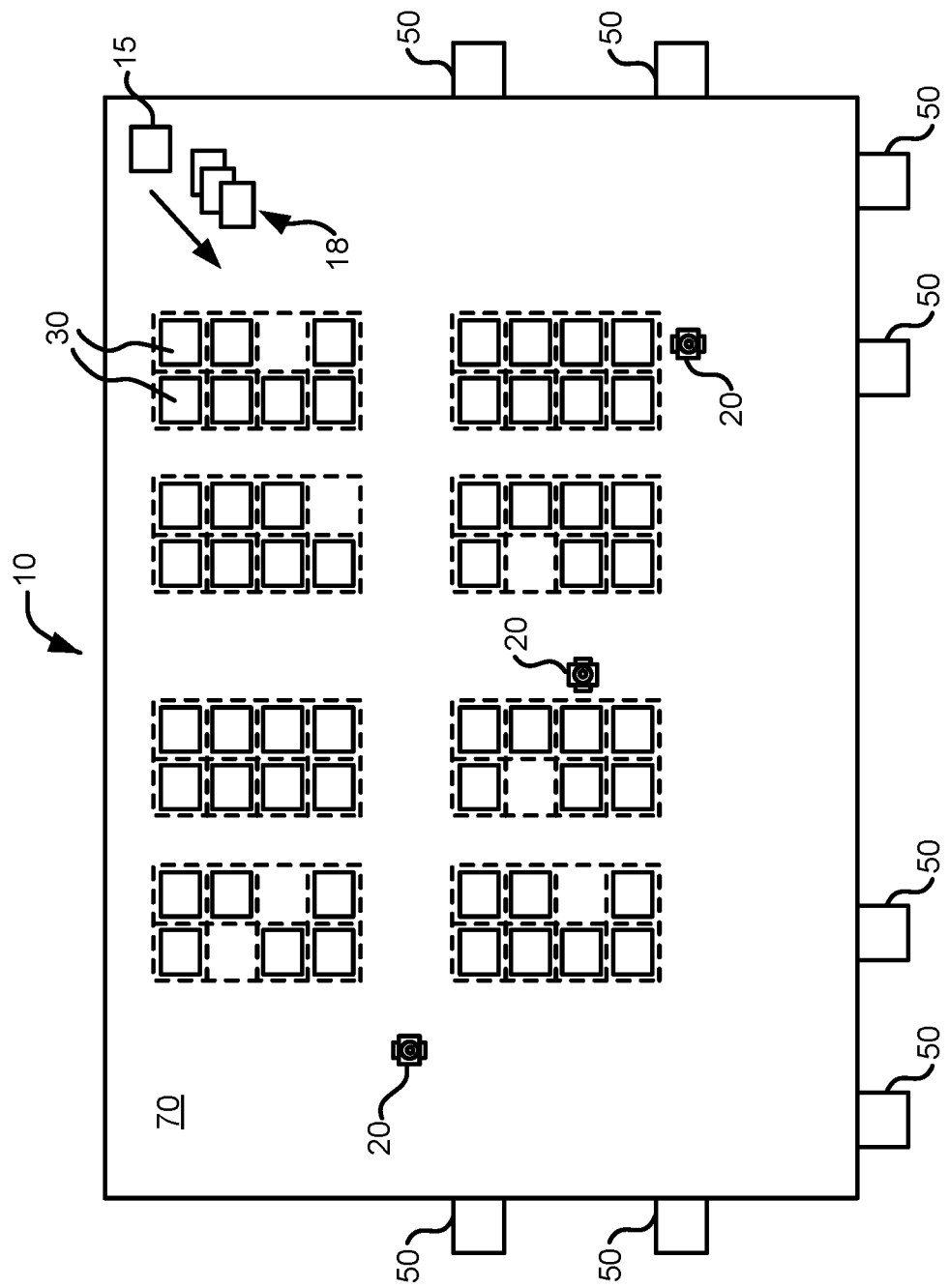
FIG. 2 illustrates components of an inventory system according to a particular embodiment.

FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
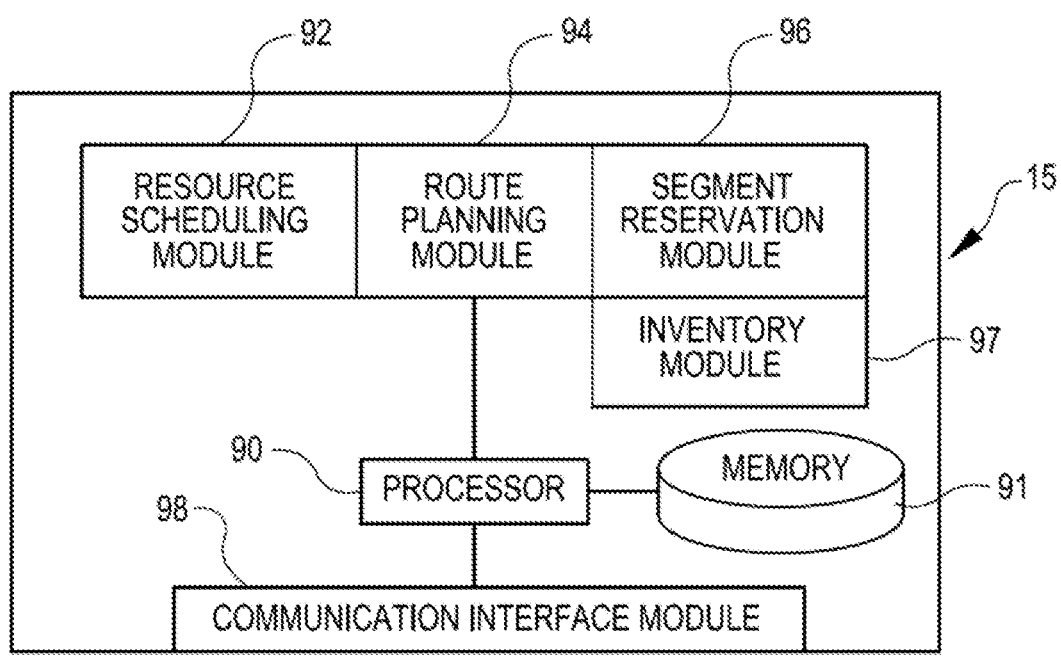
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards.

Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
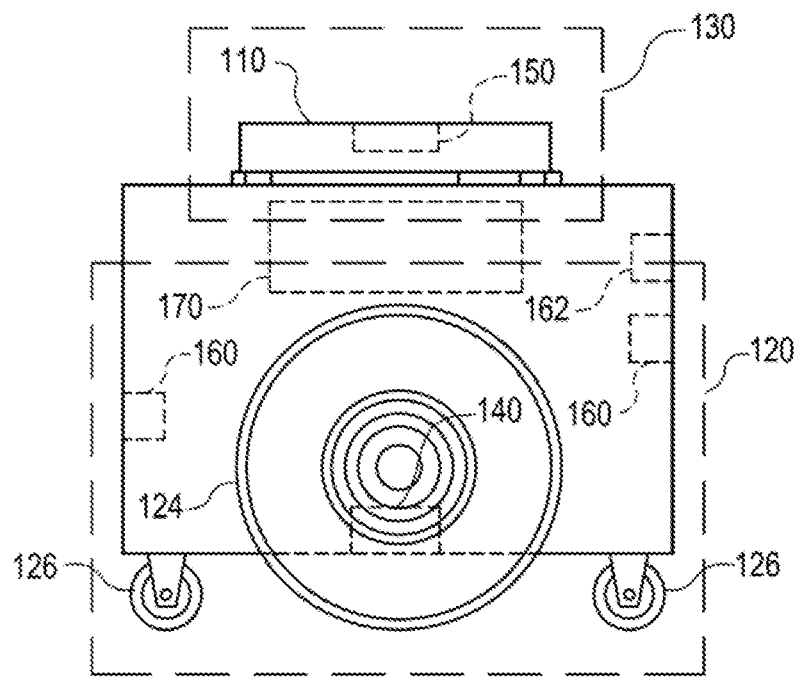
FIGS. 4 and 5 illustrate in greater detail an example mobile drive unit that may be utilized in particular embodiments of the inventory system shown in FIG. 2.
Figure 5:
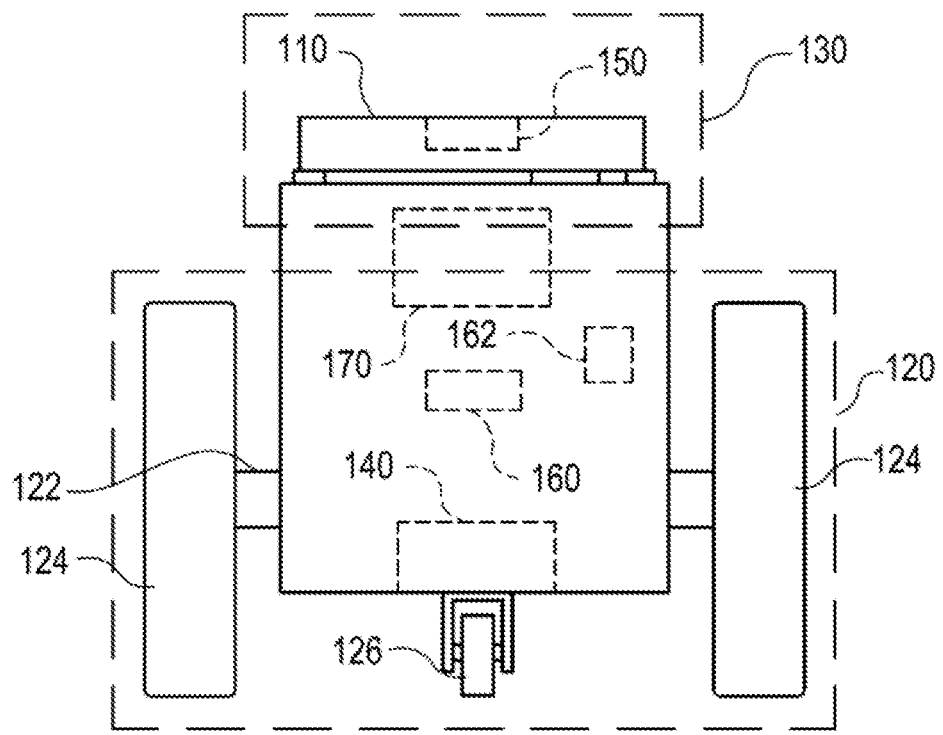

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
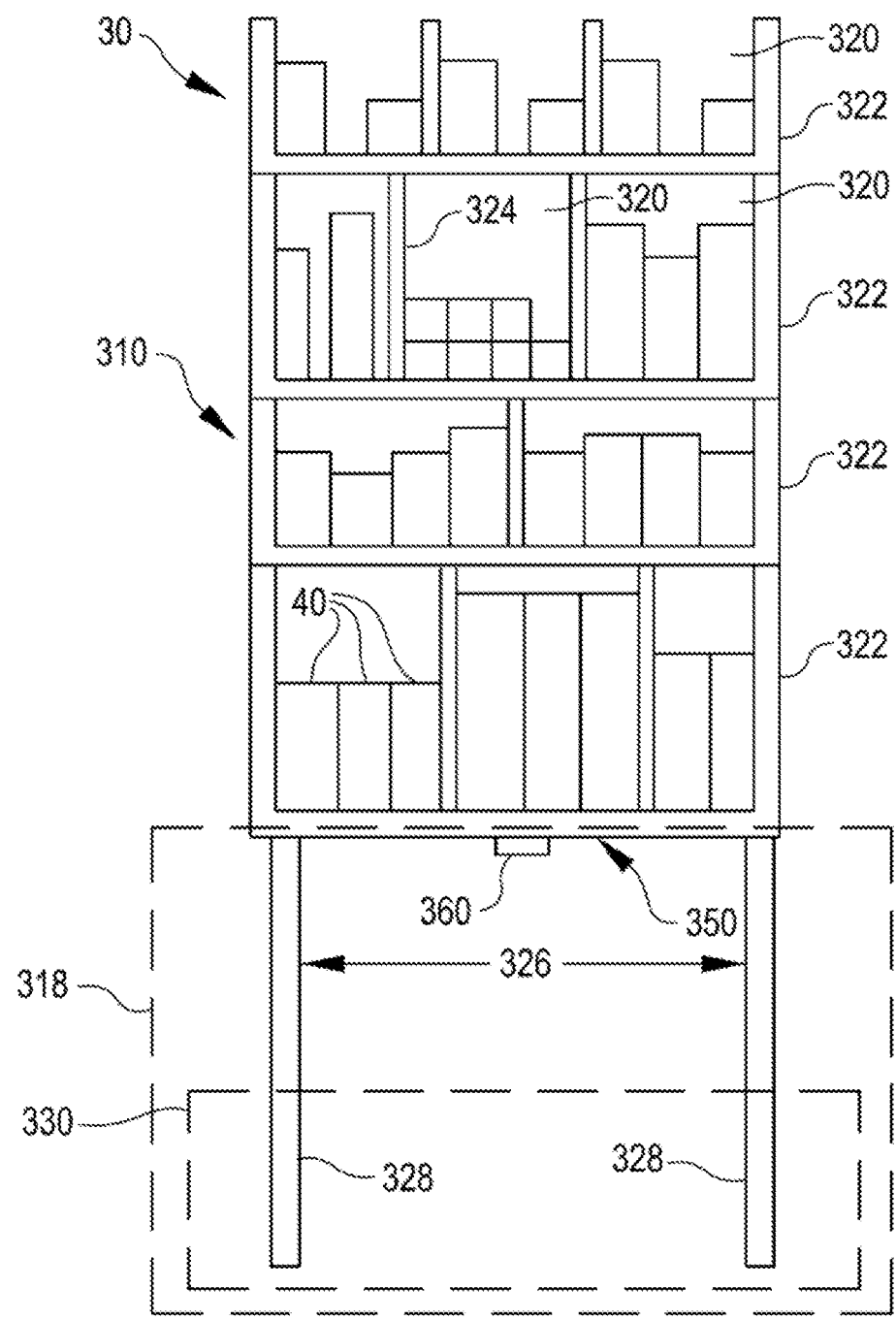
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to inventory systems that can employ inventory holders, drive units for moving the inventory holders, and robotic systems for handling inventory in conjunction with a virtual inventory system that monitors and controls the positions and activities of components of the inventory system. As is apparent from the above, such systems are almost infinitely expandable and customizable. Additional space for storage and/or sorting of inventory can be added by expanding the available space in a material handling grid; and the sorting and other material handling capabilities can be expanded by adding new equipment, such as automated inventory handling robotics, by adding new workspaces, or by adding additional drive units. In accordance with embodiments, additions of new resources to a material handling grid can be handled by updating a virtual representation of the material handling grid to include the new resources. In the case of additions of new equipment or workspaces, more than one update to the virtual representation may be performed in sequence, e.g., a first update to remove an affected area from the virtual representation, or to designate the affected area as off-limits to drive units; and a second update after the physical additions have been completed to define the new additions within the affected area and allow the resumption of use of the affected area by the inventory system.

As inventory systems expand and utilize more complex equipment, the balance of centralized and decentralized control over the various inventory system resources is tending toward decentralization. In some embodiments, control over the activities of drive units, automated inventory handling robotics, and even oversight of user workstations can be controlled by a collection of software services coordinated by a management component. In some embodiments, the collection of software services, or 'clients,' can be operated remotely on any suitable number of servers, i.e. in a distributed network or cloud-based system. Alternatively, in some embodiments, any number of software services that control an inventory system can be run on computing hardware directly associated with the management component. An example of one embodiment of a suitable inventory system is described below with reference to FIG. 7, as well as several example processes for distributing updates to a virtual representation of a material handling grid with reference to FIGS. 8-10.

Figure 7:
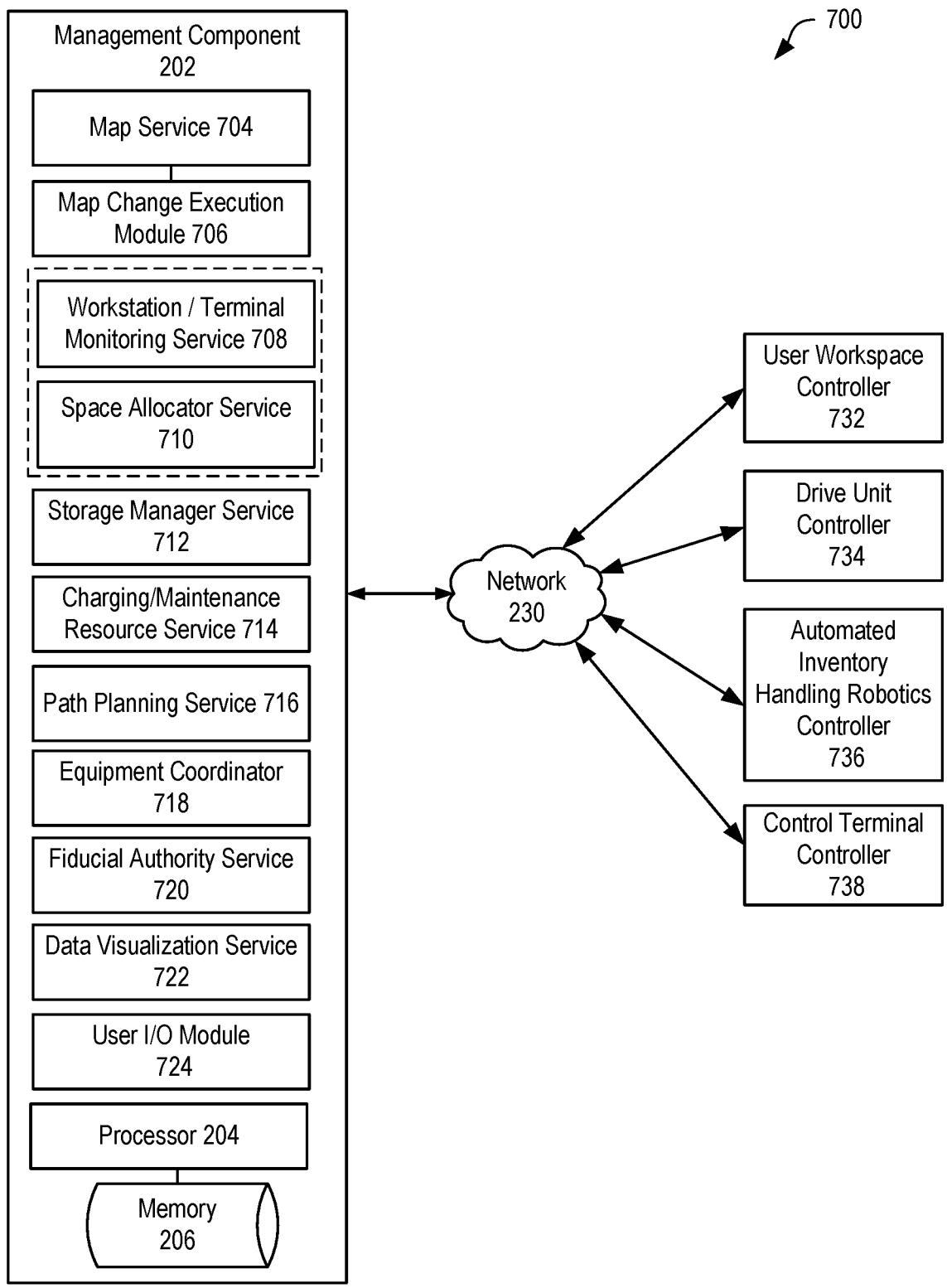
FIG. 7 is a simplified block diagram illustrating an example control system that can be used in the inventory system of FIG. 1.

FIG. 7 is a simplified block diagram illustrating an example control system 700 that can be used in the inventory system 200 of FIG. 1. The system 700 may be operable to control any suitable number of drive units 234/20 for transporting inventory holders 212/30 (FIGS. 1, 2), to control any suitable number of inventory system resources, (e.g., automated inventory handling robotics 236) as well as other system elements.

For example, the system 700 includes a management component 202, as described above with reference to FIG. 1, including a processing module 204 and memory 206 operable to maintain any, or all of, or any suitable combination of the following modules. As discussed above, any suitable number of the following modules may also be distributed, e.g. in a cloud-based architecture. The management component 202 may communicate with any distributed components, or with controllers for physical components of the inventory system, via a network 230, which may be any suitable type of wired and/or wireless network. Modules, or client services, for managing operations in an exemplary inventory system can include some or all, or any suitable subset of, the following: A map service 704 can be maintained for monitoring and/or maintaining information about the existing virtual representations, including the map or maps corresponding to various zones in an inventory system or material handling grid. The map service 704 is generally available to respond to requests from other client services for details concerning the map, such as but not limited to a grid size, locations of fiducial markings, restrictions on specific locations, and the like. A map change execution module 706 can control interactions between the map service 704 and some or all client services, e.g. during a deployment process, and can direct the client services or modules to execute map changes. Certain client services may be designated as critical services for purposes of map deployment, meaning that a negative response or failure to receive a response from these client services can be sufficient to delay or prevent deployment of a map update. Critical services can include, but are not necessarily limited to, a monitoring service 708 for monitoring and controlling access to user-operated workstations and terminals, and/or a space allocator service 710 for allocating space to drive units for movement. The workstation and/or user terminal monitoring service 708 can detect whether user-operated workstations and/or terminals are active or logged in, and can initiate a suspension or temporary logout of said workstations and/or terminals at the direction of the management component 202. The space allocator service 710, which is responsible generally for allocating space to drive units for movement, is also responsible for maintaining location information of the drive units, and for preventing collisions between drive units. For example, the space allocator service 710 can detect where a drive unit is positioned and where it is traveling, and can grant space in the material handling grid for transit by the drive unit prior to each movement. The space allocator service 710 can similarly handle allocation of space for inventory holders, and can retain records of available space based on aspects of the existing map, such as positions of obstructions, special zones, robotic inventory handlers, user workstations, and the like.

Additional modules or client services for managing operations in an inventory system can be prepared to accept updates to the virtual representations of the workspace, but are generally not granted authority to delay or prevent the a map update. Some of these additional modules or client services can include the following: A storage manager service 712 can track storage locations in the material handling grid. The storage manager service 712 can determine, from updated map data, the locations available for storage of inventory holders, as well as what locations may have been converted from storage to pathways or vice-versa, in order to queue requests for drive units to move inventory holders to appropriate locations. A charging/maintenance resource service 714 can maintain locations of charging stations, repair stations, and/or storage locations for drive units, in order to provide drive unit controllers with information about the status and positions of relevant resources for managing drive units. A path planning service 716 is generally responsible for performing route planning functions for determining paths for drive units to transit the material handling grid, with and without inventory holders; and uses map data to determine the location of available paths or obstructions. An equipment coordinator 718 can be used to coordinate with individual drive unit controllers to perform coordinated action of drive units, e.g. pausing the motion of drive units to implement the map update processes. A fiducial authority service 720 can maintain information about fiducial markings and their positions in the material handling grid, in particular managing which fiducial markings are present in a particular map. The fiducial authority service 720 updates a record of fiducial locations and their respective machine-readable indicia, as well as other information such as fiducial offsets. A data visualization service 722 can be used to generate a visible representation, e.g. for presentation to a user, of the various components of a virtual representation of the material handling grid; and a user I/O module 724 can be used to display said visible representation to an administrator or user, and to receive commands related thereto, e.g. commands to initiate a map update, or commands concerning the specific attributes of the map update.

In various embodiments, any or all of, or any subset of, the services described above with respect to management component 202 may communicate with local controllers in an inventory system, e.g. via the network 230, to control operation of inventory system resources. For example, local controllers for system resources can include, but are not limited to, a user workspace controller 732, a drive unit controller 734, automated inventory handling robotics controller 736, and terminal controller 738. In accordance with various embodiments, the user workspace controller 732 corresponds with one or more user workspaces or terminals like user workspace 232 (FIG. 1). The drive unit controller 734 is operable to direct movement of one or more drive units in an inventory system, e.g. drive unit 234 (FIG. 1), in conjunction with instructions from the management component 202 and/or related modules, e.g. the charging/maintenance resource service 714 and path planning service 716. The controller 736 for automated inventory handling robotics is operable to direct movement and tasks by one or more automated inventory handling robotics stations 236 (FIG. 1), which can include lifts, sorting stations, loading and unloading stations for moving inventory between containers, inventory holders, and/or conveyances, or the like. Likewise, the control terminal controller 738 can communicate user instructions from a control terminal 238 (FIG. 1) and/or relay reports, such as error reports or status reports, from the management component 202 to a user.

Figure 8:
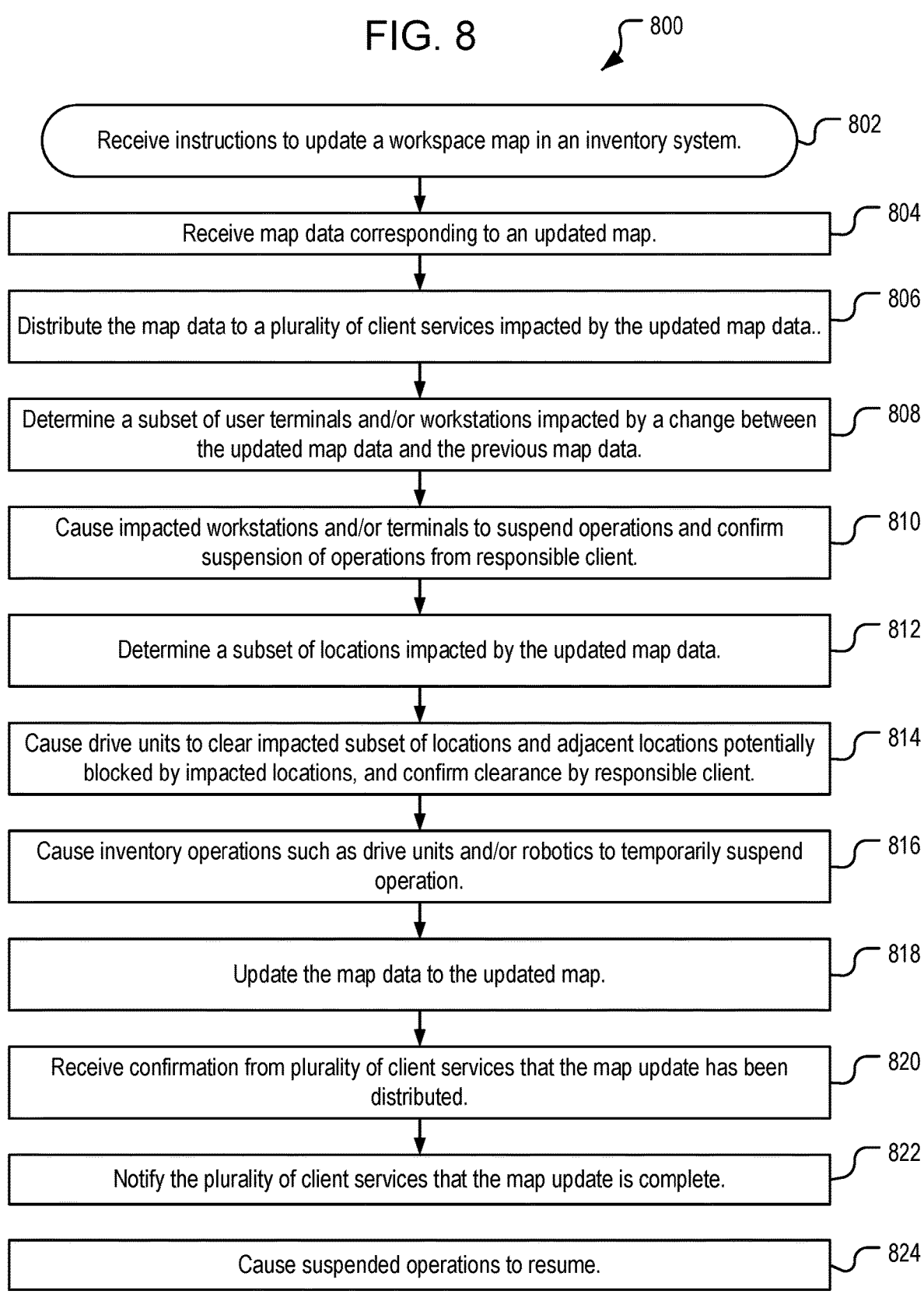
FIG. 8 illustrates a first example process for implementing an update to a virtual representation of a workspace that can be used in the inventory system of FIG. 1.
Figure 9:
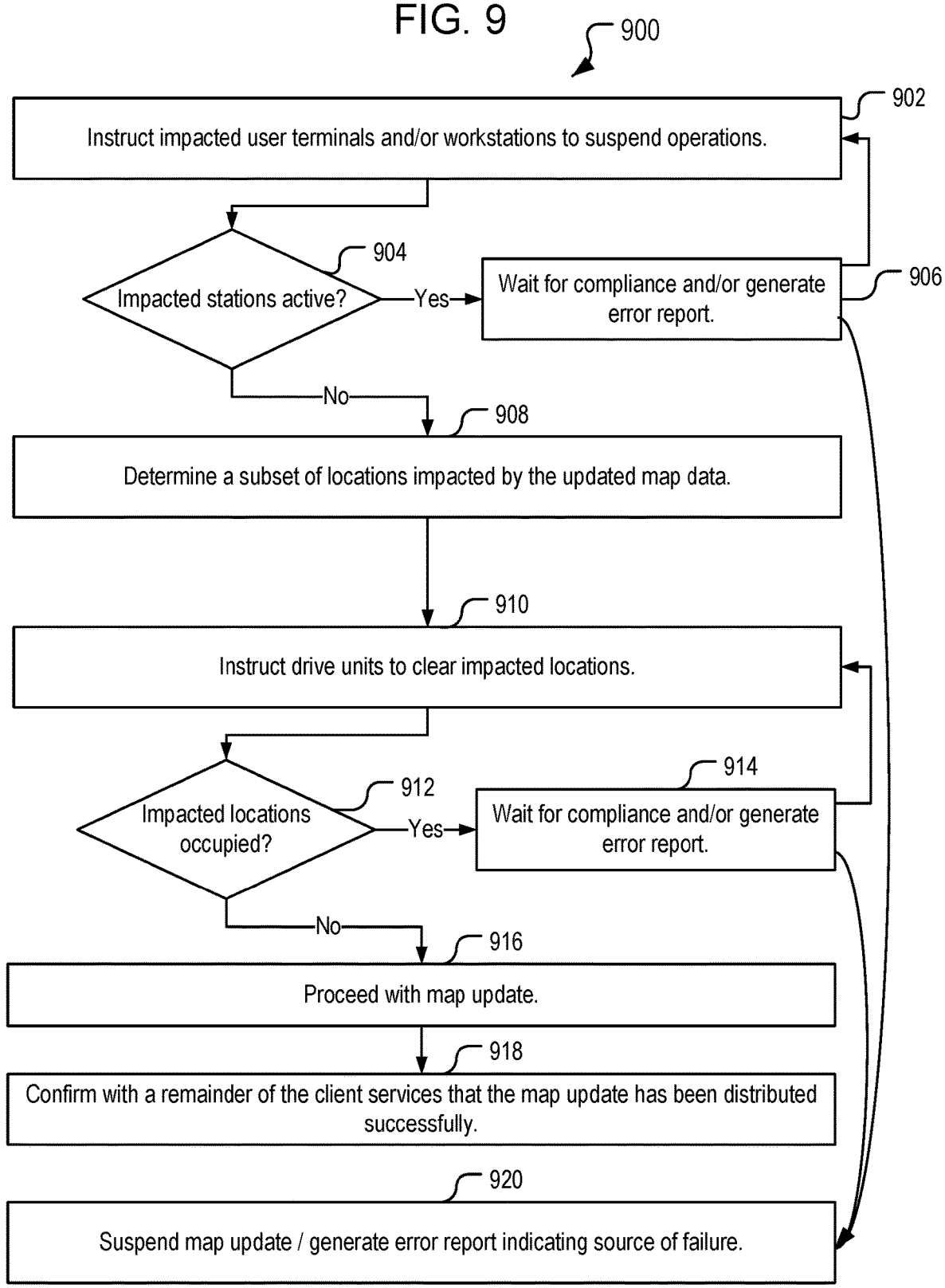
FIG. 9 illustrates a second example process for implementing an update to a virtual representation of a workspace that can be used in the inventory system of FIG. 1 and in the context of the process of FIG. 8.
Figure 10:
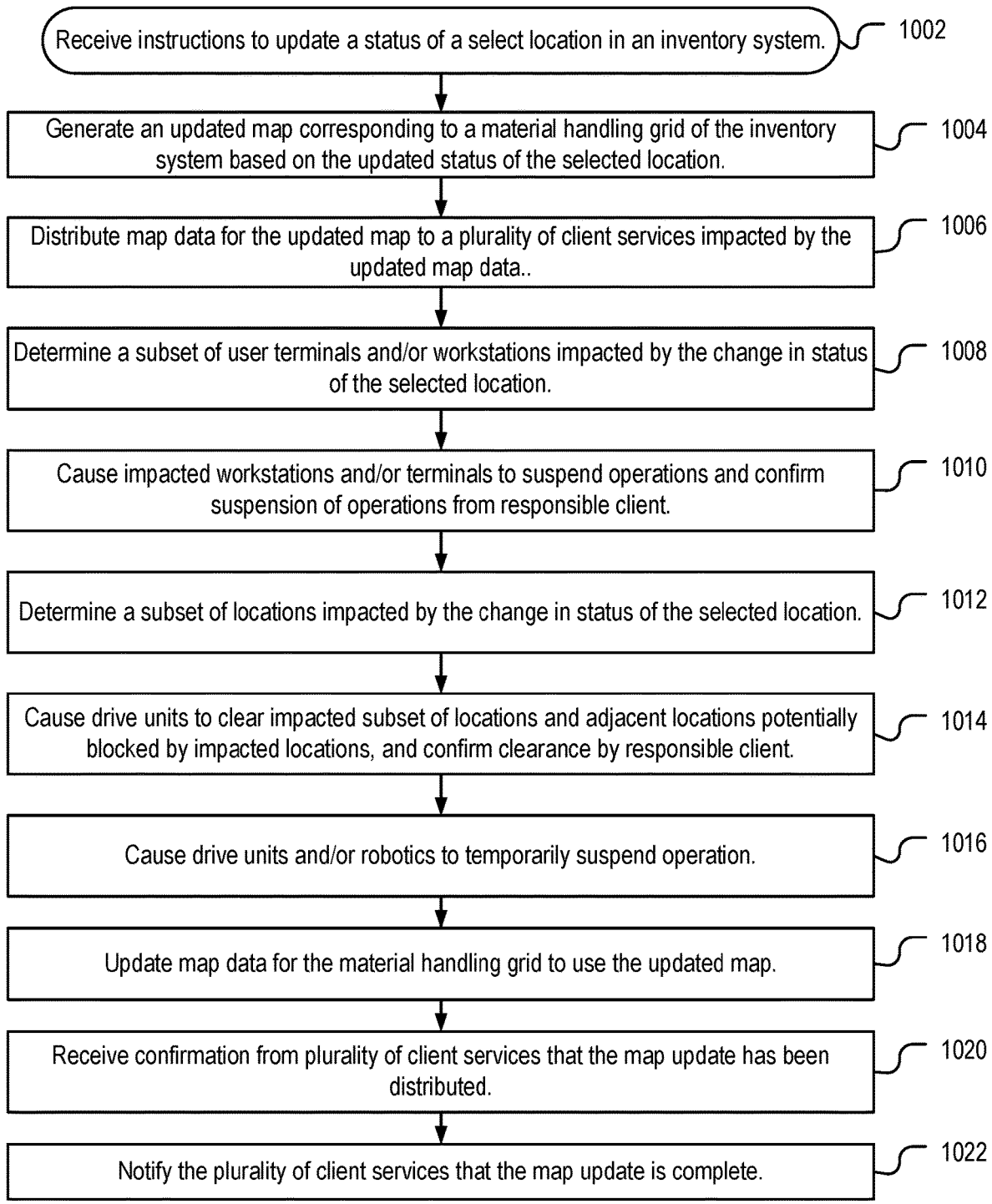
FIG. 10 illustrates a third example process for implementing an update to a virtual representation of a workspace that can be used in the inventory system of FIG. 1 and in the context of the process of FIG. 8.

FIGS. 8-10 illustrate example processes 800, 900, 1000 for implementing updates to a virtual representation of a workspace and/or to a material handling grid that can be used in conjunction with an inventory system, like the inventory system 200 of FIG. 1. Some or all of the processes 800, 900, 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Techniques described herein include methods implementing an update to a virtual representation of a workspace that can be used in the inventory system 200 of FIG. 1. For example, FIG. 8 illustrates an example process 800 for implementing an update to a virtual representation of a workspace. Aspects of the process 800 may be performed, in some embodiments, by a similar system to the system 700 discussed with reference to FIG. 7. The system may be implemented in an inventory system as described in FIG. 1 or 2, and in conjunction with a virtual representation of a material handling grid as discussed above. The system may also be implemented in conjunction with a distributed control architecture, i.e. an architecture in which the various components of the management component (e.g. management component 202, FIG. 7) are maintained across one or more, potentially many servers which may be offsite or cloud-based. In some embodiments, any suitable subset of the process steps of the process 800 may be performed in parallel except where expressly indicated otherwise.

In an embodiment, the process 800 includes receiving instructions by the inventory system, e.g. by a management component, to update a virtual representation of a workspace (act 802), e.g., a workspace map and associated information corresponding to positions in the map, along with receiving the updated map data (act 804). The updated map data can include an entire new map suitable for replacing an existing workspace map and its associated parameters, or can include partial updates for amending a section of the existing workspace map. In some embodiments, the updated map data can include a log indicating the specific locations or regions of the map that are impacted by the update. Next, the system can propagate the updated map data to any suitable number of client services that operate using the workspace map (act 806). In some embodiments, distributing the updated map data can include providing the map data and/or associated information, change logs, or the like directly to the various client services. In general, however, distributing updated map data includes providing the client services with access to another client service that maintains the updated map data for access. The system can request a report from any suitable number of the client services indicating whether and how the client services may be impacted by rolling out the updated map data to each client service, e.g. potential conflicts, collisions, or the like.

In general, some or all client services may respond to the distribution of the updated map data and/or request to report; however only a subset of client services may be required to report or to report positively before a map update can be implemented. In particular, only a subset of client services may have a 'veto' power to prevent rollout of the updated map data, even when the system collects acknowledgment from a remainder or substantial remainder of the client services. In some embodiments, the subset of critical client services that can prevent rollout of an update to the map data includes a workstation or terminal monitoring service that can track which workstations are active or logged in. In addition, or alternatively, the subset of critical client services that can prevent rollout of an update includes a space allocation service that can track the positions of any or all drive units present in the inventory system, and can determine whether drive units will be present within active zones of the updated map after the update is completed.

With respect to the workstation or terminal monitoring service, the process 800 can further include determining, by the system, a subset of user terminals and/or workstations impacted by a change between the updated map data and existing map data (act 808), e.g. by performing a comparison between the updated and existing map data, or by accessing a change log corresponding to the differences between the data. Alternatively, the system can treat all workstations within a material handling system as potentially impacted. The system can then cause any potentially impacted workstations and/or terminals to suspend operations, and request a confirmation that the stations have been suspended from the responsible client service for each station (act 810). This step can include generating instructions to cause the client service to close or log out the impacted workstations. In some cases, this step also includes providing a timer, and instructions to halt the rollout of the updated map data if either (a) the timer expires without the system receiving a positive report from the relevant client service indicating that the user terminals and/or workstations have suspended operations, or (b) the relevant client service indicates that the user terminals and/or workstation have a conflict with the updated map data.

Similarly, with respect to the space allocation service, the process 800 can further include determining, by the system, a subset of locations and/or drive units positioned at those locations that are impacted by the change between the existing and updated map data (act 812). In an embodiment, the system can cause drive units to clear the subset of impacted locations, and in some embodiments, to remove inventory holders or the like positioned in the impacted locations (act 814). Clearing impacted locations can also include assessing whether drive units would become "stranded," i.e. positioned outside the range of an updated material handling grid; or whether they would conflict with other components, i.e. become positioned overlapping with one or more other inventory system resources, or become "trapped" by other resources at an edge of the material handling grid. In either case, the system can include generating instructions to cause the client service to move system resources to regions that will be active in the updated map, and to report back to the management component 202. In some cases, this step also includes providing a timer, and instructions to halt the rollout of the updated map data if either (a) the timer expires without the system receiving a positive report from the relevant client service indicating that the system resources have been removed from an impacted region of the inventory system, or (b) the relevant client service indicates that the drive units and/or other system resources are stranded by, or conflict with the updated map data. In some embodiments, a subset of these conditions, or similar conditions, may be used. For example, in some cases it may be acceptable to allow one or more drive units or inventory holders to be stranded by a map update, but not to allow a conflict; or vice-versa.

If any of the critical client services fail to approve the updated map data, the system can generate an error report for presentation to a user, and refrain from rolling out the updated map data. Otherwise, the system can proceed to apply the updated map data as follows, in accordance with embodiments. The system can first cause the drive units and/or automated or robotic elements of the inventory system, particularly those positioned in a relevant area of the inventory system, to temporarily suspend operation (act 1816). This suspension of operations can include issuing a stop command, and then waiting a period of time to ensure compliance. For example, in some embodiments, drive units or robotics may be semi-autonomous, and continue acting in accordance with a set of instructions for a period of time without requiring or requesting new instructions. Once a predetermined period of time has elapsed, or once the relevant client service in control of the drive units has responded to indicate compliance, the system can initiate the update of the map data (act 818). Embodiments described above disclose temporary suspension of activity by drive units and by user-operated workstations, but in various embodiments, the system may also cause the suspension of other systems, such as various forms of conveyers, inventory-handling robotics, or the like. Generally, updating map data entails replacing existing map data at a client, e.g. a map service such as map service 704 (FIG. 7), with the updated map data, so that other client services that rely on map data will refer automatically to the new map data. In some other embodiments, updating map data can entail storing updated map data at a map service, and communicating new access instructions to the various client services.

Next, the system can request confirmation from the various client services that the map update has been distributed, which can include a request for any diagnostic or error reports from the various client services (act 820). If the deployment of the update to the map data is complete, the system can notify all or any suitable subset of the client services that the map update is complete, and further, can instruct any relevant client services which have been temporarily suspended to resume normal operation using the updated map data (act 824).

FIG. 9 illustrates a second example process 900 for implementing an update to a virtual representation of a workspace that can be used in the inventory system 200 of FIG. 1 and in the context of the process 800 of FIG. 8. In particular, the process 900 relates to methods of validating updated map data prior to initiating the update of the map data. For example, in accordance with embodiments, the system can instruct impacted user terminals and/or workstations to suspend operations and to report when operations have been suspended (act 902). In some cases, the terminals and/or workstations can also be instructed to report if suspension of operations is impeded. The system can check iterative, or can maintain a timer and determine whether the impacted stations remain active after the passage of a predetermined period of time (act 904). If stations remain active, the system can wait for compliance (i.e., iteratively instruct the impacted terminals and stations to suspend operations), and/or generate an error report (act 906). If the impacted stations remain active after a predetermined compliance window, the system can suspend the map update and generate an error report for presentation to a user, which may include information to identify a source of the failure (920).

The system can also determine a subset of locations impacted by the update to the map data (act 908) and instruct drive units and/or other inventory system resources to clear the impacted locations (act 910). For example, when a map update removes the availability of certain fiducial locations or grid positions as available for the use of drive units, the system can determine whether drive units and/or inventory holders will become stranded within those grid positions. In accordance with embodiments, the system can iteratively detect whether the impacted locations remain occupied, or alternatively, can maintain a timer and determine whether the impacted locations remain occupied after a period of time. If the impacted locations remain occupied, the system can wait for compliance, (i.e., iteratively instruct the drive units and/or inventory system resources to clear the impacted locations) and/or generate an error report (act 914). If the impacted locations remain occupied after a predetermined compliance window, the system can suspend the map update and generate an error report for presentation to a user, which may include information to identify a source of the failure (920).

If all critical conditions are met, i.e. if one or both of the conditions described above occur (or other conditions), the system can proceed with the map update 916, as described above with reference to FIG. 8. Once the map update is deployed, the system can confirm with a remainder of client services that the map update has been distributed successfully (act 918), and can cause the system resume any inventory management activities suspended during the update process. If the map update has been performed with respect to the inventory system generally but has failed with respect to one or more individual clients, operations will generally continue using the updated map data while an error report is generated for delivery to a user indicating which, if any, individual clients cannot accommodate the updated map data.

In general, compared to conventional systems for updating a virtual representation of an inventory system, methods described herein are advantageously much faster and better adapted to work within a distributed architecture. For example, whereas conventional methods typically required shutting down most or all inventory system resources prior to implementing a change, methods described herein may require suspension of operations over a local portion of an inventory system. Furthermore, the two-step procedures detailed herein allow most components of the system to remain active throughout a duration of the map update. For example, the entire map update process may take from 30 to 60 seconds, in some cases up to 150 seconds, or up to 300 seconds. At a high level, the update process involves a two-stage process, in which a first handshake procedure is conducted whereby the management component causes the client services to prepare for a map update, communicate that they are preparing, and query critical services to respond. In the second stage, the map update is implemented, and the client services respond to indicate that the map update has been successfully implemented. However, for non-critical components that were not required to respond prior to the update, the map deployment may still be completed even if those services fail to respond or provide an error notification. In such cases, the map deployment is completed, and an error report can be generated indicating which stations have not successfully deployed the updated map.

FIG. 10 illustrates a third example process 1000 for implementing an update to a virtual representation of a workspace that can be used in the inventory system 200 of FIG. 1 and in the context of the process 800 of FIG. 8. In particular, process 1000 describes a map update process corresponding to a specific map update, e.g., when the system receives instructions to update a status of a select location in an inventory system (act 1002). Such status update may include, e.g., designating the selected location as being access-restricted, i.e., to increase or decrease the prevalence of drive units using the selected location for transit along the material handling grid.

First, the system can generate an updated map corresponding to a material handling grid that designates the selected location according to the desired status of the location (act 1004). Then, this update to the map data can be distributed to the various client services that use the map (act 1006). As discussed above with respect to FIGS. 8 and 9, any suitable subset of user terminals and/or workstations impacted by the change in status can be determined (act 1008), and the system can cause the impacted subset of workstations and/or terminals to suspend operations and communicate the suspension by a responsible client (act 1010).

Next, the system can determine a subset of locations in the material handling grid that would be impacted by the change in status of the selected location (act 1012), and if applicable, can direct drive units and/or other inventory system resources to clear said locations (act 1014), e.g. by removing said drive units or resources from impacted regions. If all critical client services report back that the system can proceed, then the system can cause any active drive units and/or resources, or any impacted drive units and/or resources, to temporarily suspend operation for the duration of the map update (act 1016). During the updating step, existing map data may be overwritten or replaced with the updated map data; or access protocols may be changed so that system elements access the new map update (act 1018). Following the map update, the system can request and receive confirmation from any suitable number of the client services that the map update has been distributed (act 1020). In some embodiments, the system can also request a status and/or validation report from any client services that may have been impacted by the update. Once complete, the system can notify the various client services that the update to the map is complete.

Figure 11:
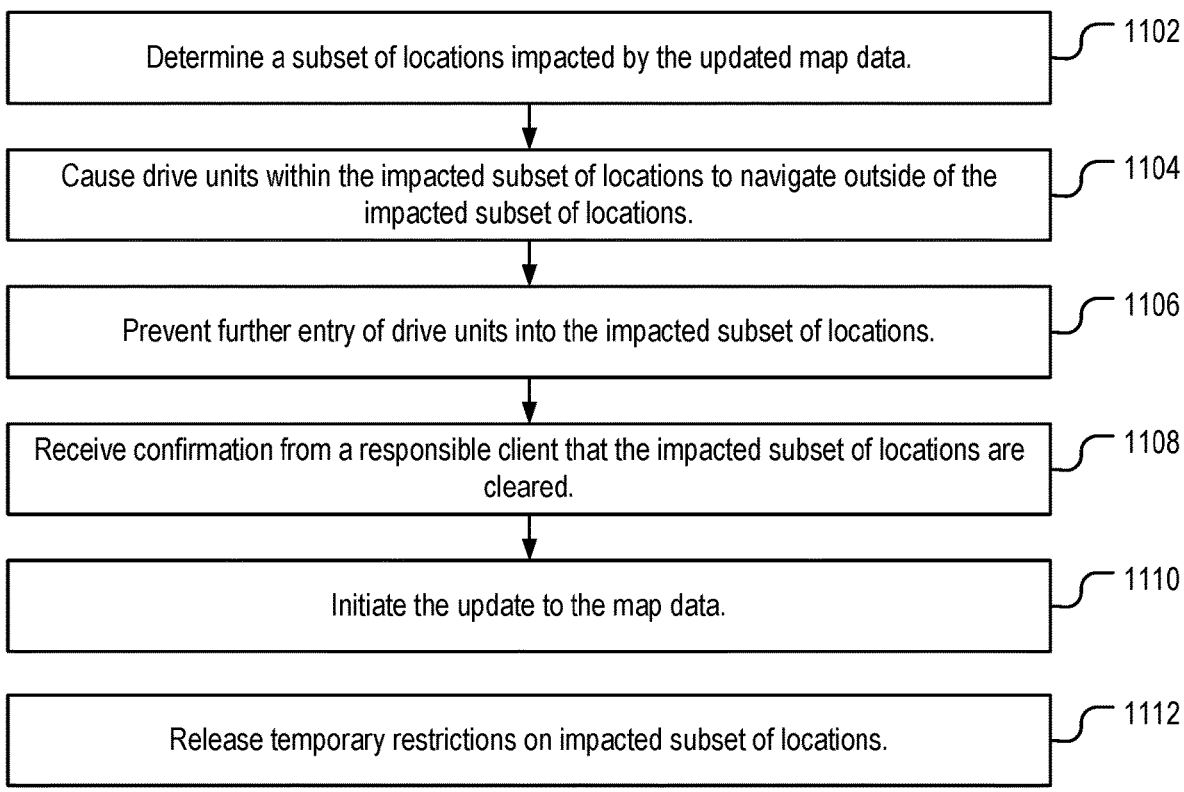
FIG. 11 illustrates a fourth example process for implementing an update to a virtual representation of a workspace.
Figure 12:
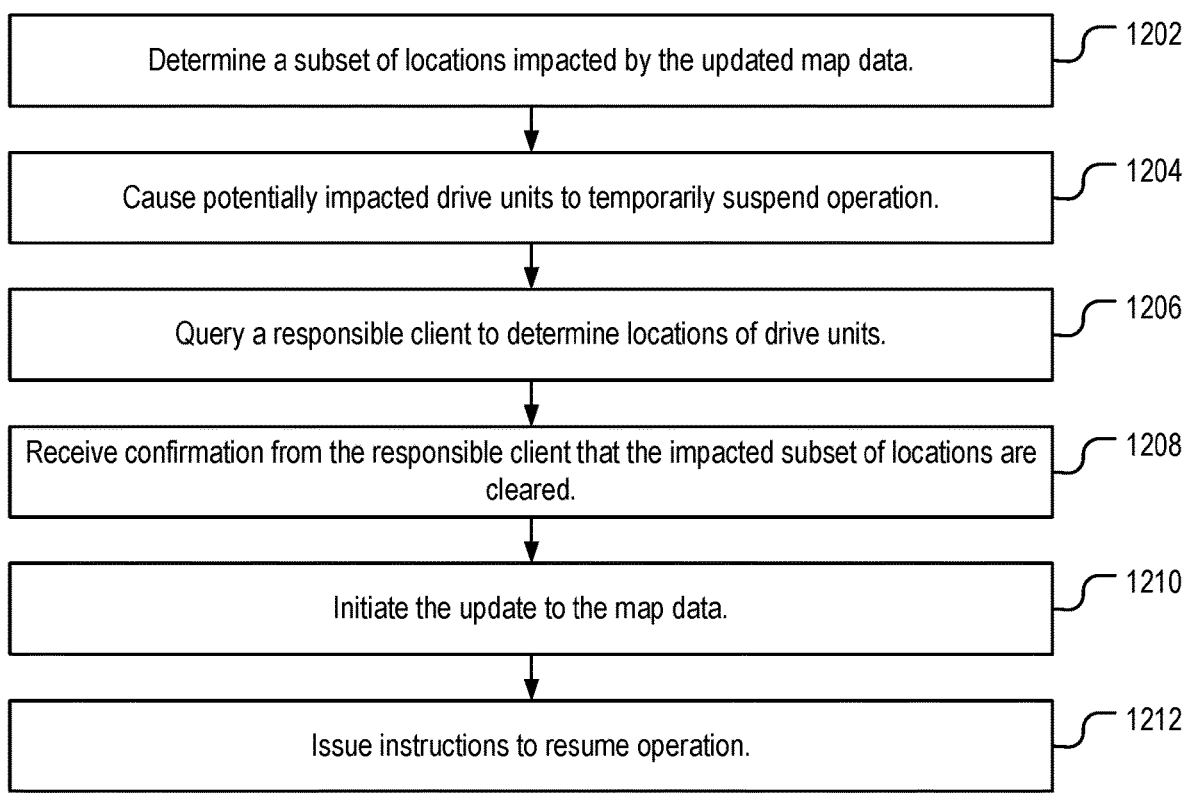
FIG. 12 illustrates a fifth example process for implementing an update to a virtual representation of a workspace.

In accordance with some specific embodiments, various techniques for accommodating drive units during a map update procedure can be used. FIGS. 11 and 12 illustrate example process 1100, 1200 which can be incorporated into or substituted for steps of any of processes 800, 900, or 1000.

In particular, the process 1100 relates to methods of securing an impacted region from drive unit ingress or interference prior to initiating the update of the map data. For example, in accordance with embodiments, the system can determine a subset of locations impacted by the updated map data (act 1102). This subset of locations can then be cleared of drive unit activity in by issuing instructions to drive units within that subset of locations to navigate elsewhere (act 1104), and by preventing further entry into that subset of locations by drive units (act 1106), either by issuing instructions to active drive units to avoid the impacted locations, or by temporarily designating the impacted locations as blocked to drive unit access. In some cases, the system can query a responsible client to determine whether the impacted locations have been cleared (act 1108). Once cleared, the system can initiate the update to the map data (act 1110) and can release any temporary restrictions placed on the impacted subset of locations (act 1112) to allow drive units to resume normal operation using the new map data.

In a related process 1200, the system can instead suspend operations of potentially impacted drive units prior to performing the update to the map data. For example, in accordance with embodiments, the system can determine a subset of locations impacted by the update to the map data (act 1202). The system can then issue instructions to potentially impacted drive units to suspend operations (act 1204). In some cases, this suspension can occur globally, i.e. over an entire inventory system. In some other cases, the suspension can occur over a subset of drive units that are located sufficiently close to the impacted subset of locations, i.e., within a distance that drive units could navigate during a time period for a map update. The suspension of operations allows time for drive units, which may operate semi-autonomously, to receive the issued suspension command, come to rest at a fiducial, and report a location to the system. The system can then query a responsible client (e.g., space allocator service 710, FIG. 7) to determine whether all of the drive units have stopped, and whether all of the drive units are clear of the impacted subset of locations (act 1206). If the system confirms that the subset of impacted locations are cleared (act 1208), the system can initiate the update the map data (act 1210) and issue instructions to the drive units that were previously suspended to resume operation (act 1212). If the system is unable to confirm that the subset of impacted locations are cleared, the system can generate an error report indicative of the failure to clear the impacted locations, and cause the system to abort the update to the map data as described above.

Figure 13:
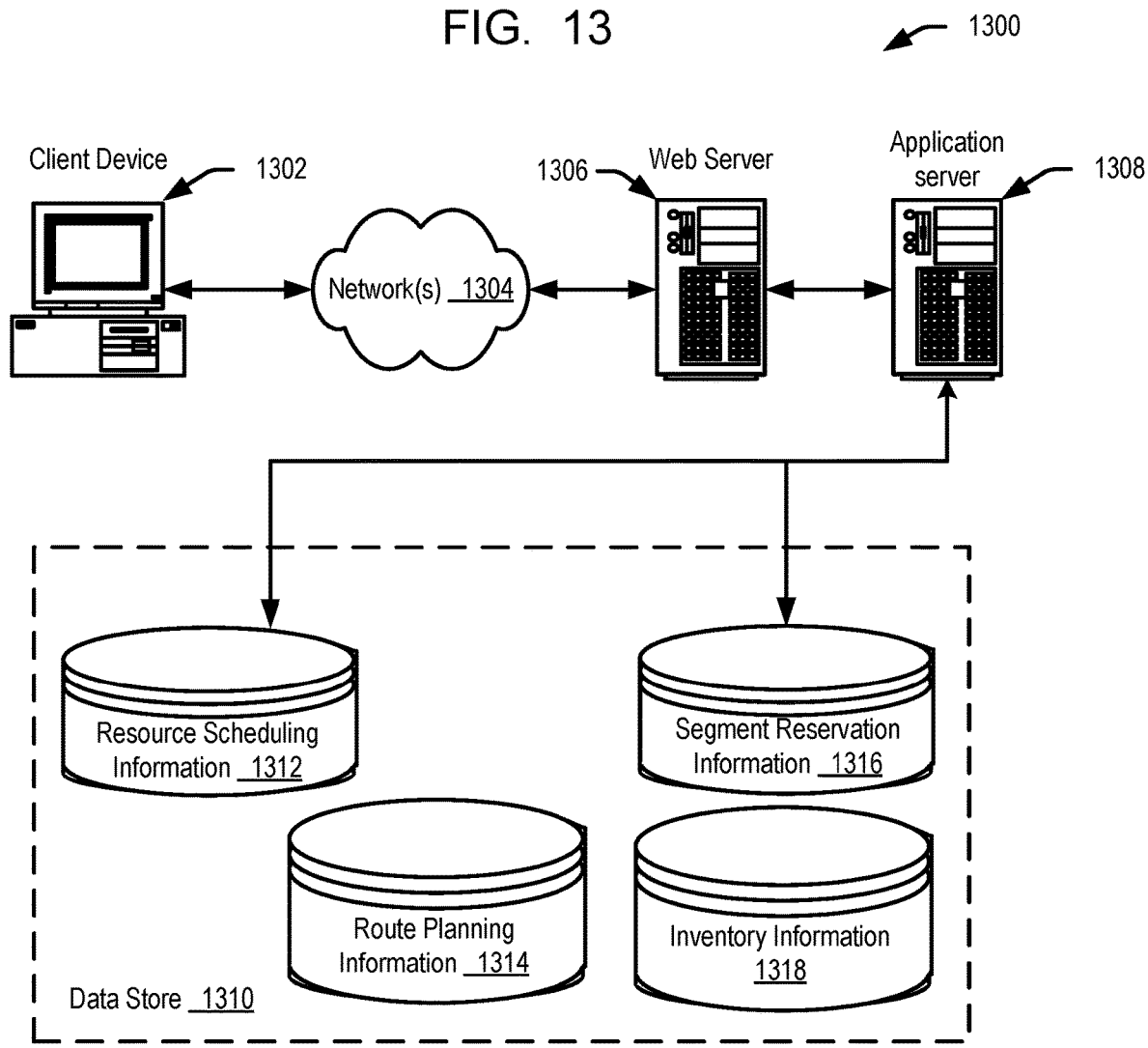
FIG. 13 illustrates an environment in which various features of the inventory system can be implemented, in accordance with at least one embodiment.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing information which can be used by modules described herein, such as resource scheduling information 1312, route planning information 1314, segment reservation information 1316, and/or inventory information 1318. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
maintaining, by a controller comprising at least one processor and a memory device, a virtual representation of a workspace in a material handling system including a virtual representation of a drive-unit navigable grid and positions of physical resources in the workspace;
maintaining, by the controller, modules executable by the at least one processor to direct movement of unmanned drive units in the workspace, the modules including at least a monitoring service module, a space allocator module, and a map service module, wherein:
the monitoring service module monitors activity at a user workstation to determine whether the user workstation is active;
the space allocator service module maintains a record of the positions of the physical resources, including positions of inventory holders and the unmanned drive units, within the virtual representation of the workspace; and
the map service module stores the virtual representation of the drive-unit navigable grid;
receiving, by the controller, an instruction to update the virtual representation of the drive-unit navigable grid stored by the map service module with an updated virtual representation that reflects updated positions of the physical resources in the workspace;
querying a subset of the modules to determine whether the update to the virtual representation would cause a conflict within the workspace; and
in response to a determination that the updated virtual representation would not cause a conflict, deploying the updated virtual representation of the workspace and notifying the modules that the deploying has occurred.

2. The method of claim 1, further comprising:
suspending operation of the unmanned drive units while the updated virtual representation is being deployed; and
subsequent to deploying the updated virtual representation, causing the unmanned drive units to resume operation using the updated virtual representation.

3. The method of claim 1, further comprising:
determining an impacted region of the drive unit navigable grid corresponding to differences between the virtual representation and the updated virtual representation;
causing the unmanned drive units to navigate out of and/or remain out of the impacted region while the updated virtual representation is being deployed.

4. The method of claim 1, wherein:
the subset of the modules comprises a critical subset of the modules; and
upon determining that the critical subset of the modules cannot deploy the updated virtual representation, cancelling the deploying of the updated virtual representation.

5. The method of claim 1, further comprising:
detecting, by the monitoring service module, whether a user workstation is active; and
in response to detecting that the user workstation is active, suspending operation of the user workstation.

6. The method of claim 1, further comprising:
in response to a determination that the updated virtual representation would cause a conflict, preventing the deploying of the updated virtual representation; and
generating an error report for presentation to a user indicating that the virtual representation could not be updated.

7. The method of claim 1, wherein:
deploying the updated virtual representation comprises replacing, by the map service module, the virtual representation with the updated virtual representation.

8. The method of claim 7, wherein:
the modules are operable to access the updated virtual representation via the map service module.

9. The method of claim 1, wherein:
at least two of the modules comprise remote services operating in a distributed environment.

* * * * *